United States Patent
Bosshart

(10) Patent No.: US 6,703,884 B2
(45) Date of Patent: Mar. 9, 2004

(54) SYSTEM AND METHOD FOR DISTRIBUTING A REFERENCE CLOCK IN AN INTEGRATED CIRCUIT USING FILTERED POWER SUPPLY LINE

(75) Inventor: Patrick W. Bosshart, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/159,584

(22) Filed: May 30, 2002

(65) Prior Publication Data

US 2003/0222695 A1 Dec. 4, 2003

(51) Int. Cl.[7] ............................................... G06F 1/04
(52) U.S. Cl. ...................................... 327/295; 327/551
(58) Field of Search .............................. 327/295–297, 327/530–532, 535, 538, 551, 552; 363/39, 44–47

(56) References Cited

U.S. PATENT DOCUMENTS

| 5,557,779 | A | * | 9/1996 | Minami ........................... 716/6 |
|---|---|---|---|---|
| 5,627,736 | A | * | 5/1997 | Taylor ........................... 363/39 |
| 5,796,995 | A | | 8/1998 | Nasserbakht et al. ........ 713/503 |
| 5,844,954 | A | | 12/1998 | Casasanta et al. ........... 375/373 |
| 5,969,559 | A | * | 10/1999 | Schwartz ..................... 327/295 |
| 6,078,634 | A | | 6/2000 | Bosshart ...................... 375/376 |
| 6,127,880 | A | * | 10/2000 | Holst et al. .................. 327/531 |
| 6,184,746 | B1 | * | 2/2001 | Crowley ....................... 327/551 |
| 6,204,732 | B1 | | 3/2001 | Rapoport et al. ............... 331/2 |
| 6,229,861 | B1 | | 5/2001 | Young .......................... 375/356 |
| 6,275,548 | B1 | | 8/2001 | Wolf et al. ................... 375/355 |
| 6,285,172 | B1 | | 9/2001 | Torbey ......................... 323/237 |
| 6,292,016 | B1 | | 9/2001 | Jefferson et al. ............... 326/39 |
| 6,295,315 | B1 | | 9/2001 | Frisch et al. ................. 375/226 |
| 6,324,234 | B1 | | 11/2001 | Kiasaleh ...................... 375/355 |
| 6,327,218 | B1 | | 12/2001 | Bosshart ...................... 365/233 |
| 6,331,805 | B1 | | 12/2001 | Gupta et al. ............... 331/107 S |

* cited by examiner

Primary Examiner—Minh Nguyen
(74) Attorney, Agent, or Firm—Alan K. Stewart; W. James Brady, III; Frederick J. Telecky, Jr.

(57) ABSTRACT

A clock distribution system and method for an integrated circuit includes a power supply line and a plurality of clock distribution elements. The power supply line is operable to provide resistive-capacitive (RC) filtered power. The clock distribution elements are coupled to the power supply line. The clock distribution elements are operable to be powered by the RC filtered power supply to distribute a reference clock signal.

24 Claims, 3 Drawing Sheets

Figure 4:
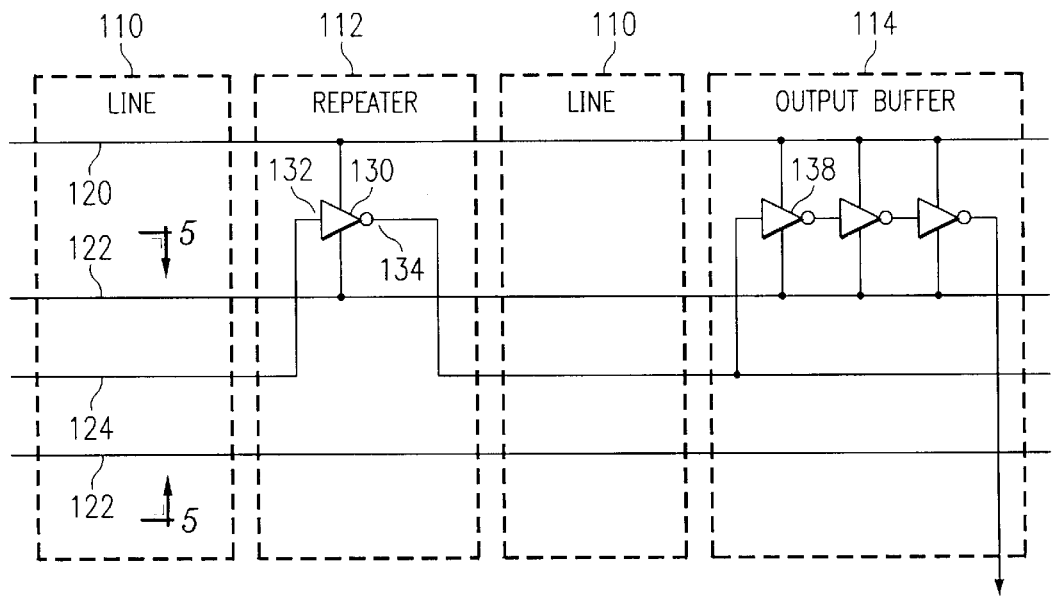

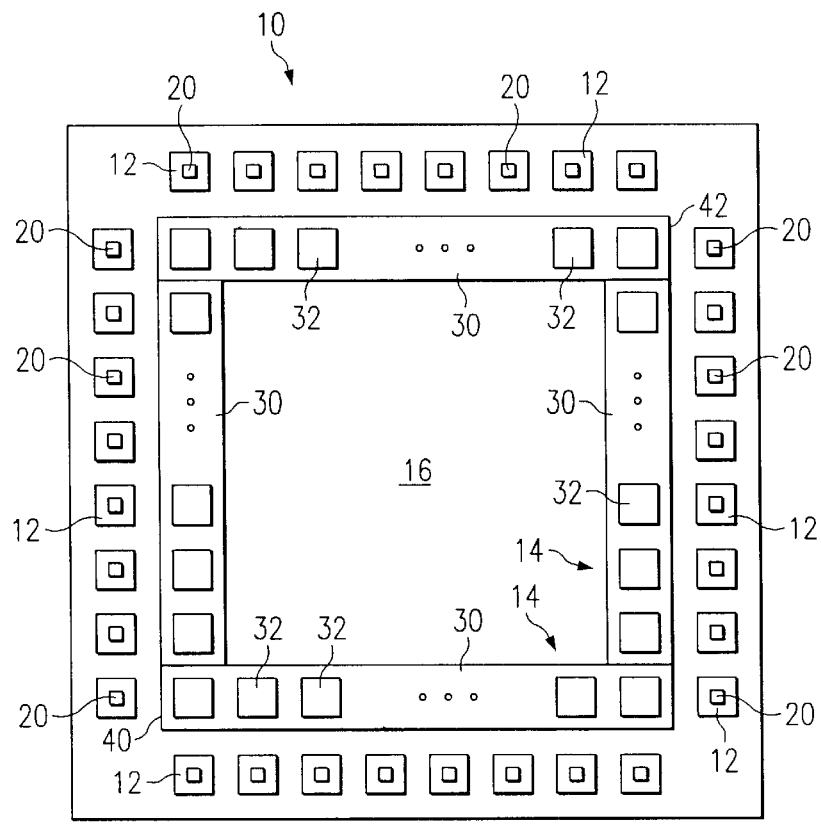
FIG. 1
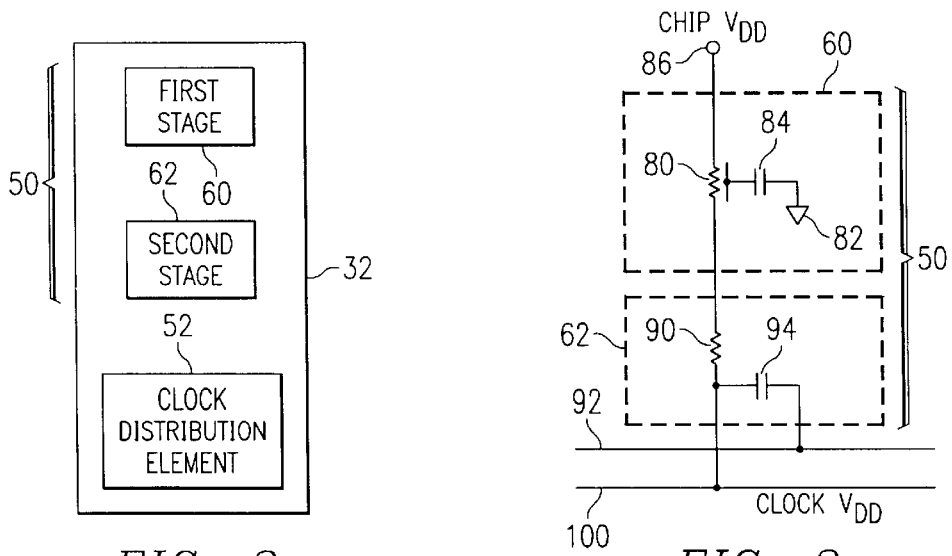
FIG. 2
FIG. 3

SYSTEM AND METHOD FOR DISTRIBUTING A REFERENCE CLOCK IN AN INTEGRATED CIRCUIT USING FILTERED POWER SUPPLY LINE

RELATED PATENT APPLICATIONS

This application is related to U.S. patent application Ser. No. 10/159,706 entitled "System and Method for Decoupling Capacitance for an Integrated Circuit Chip" filed on May 30, 2002, now U.S. Pat. No. 6,657,484.

TECHNICAL FIELD OF THE INVENTION

This invention relates generally to the field of integrated circuits, and more particularly to a system and method for distributing a reference clock in an integrated circuit.

BACKGROUND OF THE INVENTION

Modern electronic equipment such as televisions, telephones, radios and computers are generally constructed of solid state devices. Solid state devices are preferred in electronic equipment because they are extremely small and relatively inexpensive. Additionally, solid state devices are very reliable because they have no moving parts, but are based on the movement of charge carriers.

Solid state devices may be transistors, capacitors, resistors, and other semiconductor devices. Typically, such devices are formed in and on a substrate and are interconnected to form an integrated circuit. Typically, integrated circuits are attached to a lead frame and protectively packaged to form an integrated circuit chip that can be directly connected to a printed circuit board of an electronic device. Through the printed circuit board, the integrated circuit chip is connected to other chips and to external inputs and outputs.

Integrated circuit chips typically operate based on a reference clock signal received from the printed circuit board. On the chip, the reference clock is distributed to the various devices that utilize the signal. To reduce jitter of the reference clock, inverters have been used as part of the on-chip clock distribution system. For high frequency systems, however, jitter remains a problem.

SUMMARY OF THE INVENTION

The present invention provides a system and method for distributing a reference clock in an integrated circuit that reduces or eliminates at least some of the problems and disadvantages associated with previous systems and methods.

In accordance with one embodiment of the present invention, a clock distribution system and method for an integrated circuit includes a power supply line and a plurality of clock distribution elements. The power supply line is operable to provide resistive-capacitive (RC) filtered power. The clock distribution elements are coupled to the power supply line. The clock distribution elements are operable to be powered by the RC filtered power to distribute a reference clock signal.

More specifically, in accordance with a particular embodiment of the present invention, the clock distribution elements may each comprise at least one of a reference clock line, a repeater for the reference clock line and an output buffer of the reference clock line. In this and other embodiments, the RC filter may comprise a multi-stage filter. The multi-stage filter may include a first stage distributed RC filter and a second, single stage filter.

Technical advantages of the present invention include providing an improved method and system for distribution of a reference clock on an integrated circuit chip. In one embodiment, the clock distribution system is powered by a filtered and/or cleaned power supply signal to reduce noise. As a result, reference clock jitter across the distribution system remains low.

Another technical advantage of the present invention includes providing a multi-stage resistive-capacitive (RC) filter for an on-chip clock distribution system. In one embodiment, the RC filter is a two-stage filter with a distributed first stage. The multi-stage filter provides efficient noise attenuation and allows high-speed and distributed serial links on the integrated circuit.

Still another technical advantage of the present invention includes providing a modular design for a clock distribution system. In one embodiment, the clock distribution system comprises a number of modules each constructed from repeater, local buffer, wire and/or filter units. This design allows easy adaptation to various circuit layouts and configurations.

Other technical advantages of the present invention will be readily apparent to one skilled in the art from the following figures, description and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 1 is a block diagram illustrating an integrated circuit chip in accordance with one embodiment of the present invention;

FIG. 2 is a block diagram illustrating details of the clock distribution unit of FIG. 1 in accordance with one embodiment of the present invention;

FIG. 3 is a circuit diagram illustrating details of the resistive-capacitive (RC) filter of FIG. 2 in accordance with one embodiment of the present invention;

FIG. 4 is a circuit diagram illustrating details of various clock distribution elements of FIG. 2 in accordance with one embodiment of the present invention;

FIG. 5 is a cross-sectional diagram illustrating details of the clock and ground lines of FIG. 4 in accordance with one embodiment of the present invention;

FIG. 6 is a block diagram illustrating details of the clock distribution unit of FIG. 1 in accordance with another embodiment of the present invention;

FIG. 7 is a circuit diagram illustrating details of the RC filter of FIG. 6 in accordance with one embodiment of the present invention;

FIG. 8 is a flow diagram illustrating a method for powering a clock distribution system in accordance with one embodiment of the present invention; and FIG. 9 is a flow diagram illustrating a method for providing decoupling capacitance for an integrated circuit chip in accordance with one embodiment of the present invention.

DETAILED DESCRIPTION OF THE INVENTION

FIG. 1 illustrates an integrated circuit chip 10 in accordance with one embodiment of the present invention. The integrated circuit chip 10 may be a microprocessor, a memory, a field programmable gata array (FPGA), an application specific integrated circuit (ASIC) and the like. In the ASIC embodiment, for example, the integrated circuit chip 10 may be a switch chip used to receive traffic from ingress links and switch traffic to egress links of a telephony device. Traffic may be internet protocol (IP) packets, asynchronous transfer mode (ATM) cells, other suitable datagrams or signals. It will be understood that the integrated circuit chip 10 may be attached to a lead frame, packaged and connected to a printed circuit board to receive, process and/or store data in any suitable application.

Referring to FIG. 1, for a switch chip and other embodiments, the integrated circuit chip 10 may include a plurality of serial links 12 disposed along the periphery of the chip 10, a clock distribution system 14, and a core area 16. The clock distribution system 14 may be disposed at a periphery of the core area 16 and adjacent to the serial links 12. The serial links 12 may be high-speed serial links transmitting and/or receiving traffic at one gigahertz (GHz), 3 GHz or greater or other suitable rate. The serial links 12 may each include a phase-lock loop (PLL) 20 operable to sample and recover a reference clock time base. As described in more detail below, the PLL 20 may, in one embodiment, attenuate jitter of the clock signal by factor of five.

The clock distribution system 14 is an on-chip system that is fabricated as part of the integrated circuit. The clock distribution system 14 distributes the clock signal to components of the chip 10 that operate based on the clock signal. The reference clock signal may be received from an off-chip source and propagated in several directions on the chip from an ingress point 40 to a termination point 42. In one embodiment, travel distance of the reference clock signal is minimized to the extent possible given design constraints of the core 16 to limit delay of the reference clock in propagation from the ingress point 40 to the termination point 42.

The clock distribution system 14 may include a plurality of clock distribution modules 30 each operable to distribute the reference clock signal to a portion of the chip 10. In one embodiment, as described in more detail below, the clock distribution modules 30 are each a linear section constructed of a plurality of modular clock distribution units 32 serially connected to each other along the module 30. This modular design may allow easy adaptation of the distribution system 14 to various circuit layouts and configurations. The modules 30 may have other suitable configurations and the units 32 may be otherwise suitably connected.

The core 16 may comprise complimentary metal oxide semiconductor (CMOS) and other transistors and solid state components and interconnections to process and/or store data on the chip 10. In the switch chip embodiment, the core 16 may comprise a plurality of CMOS transistors to perform the switching functionality of the chip 10. During operations, the core 16 generates a load on the chip 10.

FIG. 2 illustrates details of the clock distribution units 32 in accordance with one embodiment of the present invention. In this embodiment, the clock distribution system 14 propagates a single reference clock signal for use on the chip 10.

Referring to FIG. 2, the clock distribution unit 32 includes a resistive-capacitive (RC) filter 50 and a clock distribution element 52. The RC filter 50 receives a power signal from a chip power source and filters the power signal to remove and/or attenuate noise in the signal. The RC filter 50 generates a clean power signal for use by the clock distribution element 52. The RC filter 50 may comprise any suitable arrangement of resistors and capacitors as well as other suitable components operable to filter noise from the chip power supply signal.

In one embodiment, the RC filter 50 comprises a multi-stage filter. In this embodiment, the RC filter 50 may be a two stage RC filter including a first stage 60 and a second stage 62. The first stage 60 may be a distributed RC filter. The second stage 62 may be a single stage RC filter. The first and second stage RC filters are described in more detail in connection with FIG. 3.

The clock distribution element 52 propagates, processes and/or utilizes the clock signal. In one embodiment, the clock distribution element 52 may include a reference clock line, a repeater for the clock line, and/or an output buffer of the clock distribution system 14. The clock distribution element 52 may also include and/or have pass through a clean power supply line with power filtered by the RC filter 50 and a clean ground for powering repeaters and output buffers of the clock distribution system 14. Additional details of the clock distribution element 52 are described in more detail in connection with FIG. 4.

FIG. 3 illustrates details of the first stage RC filter 60 and of the second stage RC filter 62 in accordance with one embodiment of the present invention. In this embodiment, the first stage RC filter 60 is a distributed RC filter. The second stage RC filter 62 is a single stage RC filter.

Referring to FIG. 3, the distributed RC filter of the first stage 60 includes a resistor 80 capacitively coupled to ground 82 through a set of capacitors 84. These and other elements and components of the RC filter 50, the clock distribution system 14, and the chip 10 may be coupled to each other by direct and/or indirect connections. The first stage filter 60 is coupled to and receives power from a chip power supply line (Chip $V_{DD}$) 86 and provides a first stage RC filtered or cleaned power signal to the second stage filter 62.

The single stage RC filter of the second stage 62 includes a resistor 90 capacitively coupled to a clean ground 92 of the clock distribution system 14 by a capacitor 94. The second stage 62 receives the first stage filtered power signal from the first stage 60 and further filters the signal to generate an RC filtered or clean power signal. The RC filtered power signal is provided to a clean power line (Clock $V_{DD}$) 100 of the clock distribution system 14. The clean ground 92 may be periodically coupled to the chip ground 82.

In a particular embodiment in which the chip 10 is an ASIC switch chip having a CMOS core and three gigabyte per second differential pin serial links 12, reference clock may be 311 megahertz (MHz). In this embodiment, chip power supply may be 1.8 volts. The first stage RC filter 60 may comprise a resistor 80 of 0.25 ohms and a capacitance of 20 nano Farads. In another embodiment, the first stage RC filter 60 may comprise a resistor 80 of 2.5 ohms while the capacitance remains at 20 nano Farads. This may provide increased power supply filtering capability. The second stage 62 may comprise a resistor of 2 ohms and a capacitance of 5 nano Farads. In this embodiment, the RC filter power signal may have a noise level below ±7 millivolts (mV) and the reference clock may have on-chip jitter below ±8 ps peak to peak.

In addition to providing an RC filter power signal, the RC filter 50 provides on-chip distributed RC decoupling capacitance. In particular, the multi-stage RC filters in the clock distribution units 32 of the clock distribution system 14 provide damping of inductance-capacitance (LC) resonance between the packaging and the load of the chip 10. The use of the multiple RC filters 50 provide a single design solution over a broad range of designs. For the exemplary embodiment described above, the distributed RC decoupling of capacitance may damp LC resonance around 66 MHz, typically between 40–100 MHz. In the CMOS, MOS or other suitable embodiments, the gate capacitance of these transistors between gate and the source/drain (between $V_{DD}$ and ground for n-channel and between ground and $V_{DD}$ for p-channel) provides the decoupling capacitance.

FIG. 4 illustrates a series of clock distribution elements 52 in accordance with one embodiment of the present invention. In the illustrated embodiment, the clock distribution elements 52 include a line element 110, a repeater element 112, an additional line element 110 and an output buffer element 114. The elements may be otherwise arranged and comprise other components without departing from the scope of the present invention.

Referring to FIG. 4, the line element 110 includes a power line 120 providing RC filtered power for components of the clock distribution elements and includes clean grounds 122. The clean grounds 122 border a reference clock line 124 propagating the reference clock signal. Details of the clean grounds 122 and reference clock line 124 are described in more detail in connection with FIG. 5. Power and other lines may be similarly formed.

The repeater element 112 includes the clean power supply line 120 and the clean grounds 122 as well as a repeater 130 coupled to the reference clock line 124. The repeater is coupled to the clean power supply line 120 and the ground lines 120 and 122 and powered by the RC filtered power. The repeater 130 may be an inverter or other suitable element operable to receive and regenerate a reference clock signal.

In operation, the repeater 130 receives the reference clock signal at input 132, regenerates the reference clock signal and outputs the reference clock signal at output 134. To control or minimize resistance in the reference clock line 124, repeater elements 112 may be spaced every 3 millimeters (mm) apart.

The output buffer element 114 includes the clean power supply line 120 and the clean grounds 122 as well as an output buffer 13 coupled to the reference clock line. The output buffer 130 includes a plurality of inverters each coupled to the clean power supply and ground lines 120 and 122 and powered by the RC filtered power. The local output buffers provide a local tap for output of the reference clock signal for use by the high speed serial links 12. The output buffer elements 114 may be spaced at each serial link 12 and as otherwise needed to provide a reference clock output to components of the chip 10.

Figure 5:
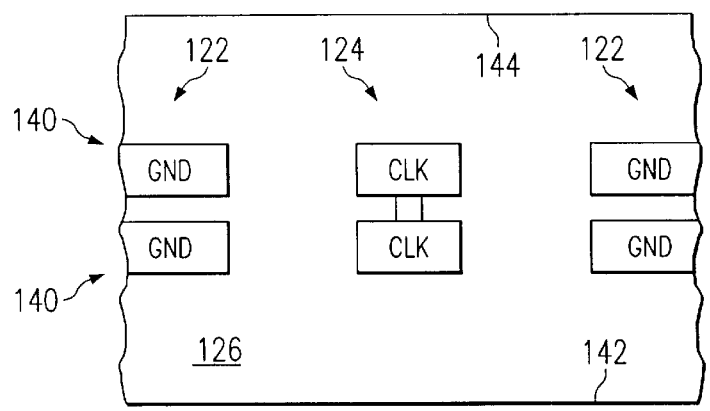

FIG. 5 illustrates details of the clean ground lines 122 and the reference clock line 124 in accordance with one embodiment of the present invention. In this embodiment, the ground and reference clock lines 122 and 124 are each fabricated from two metalization layers 140. The ground and reference clock lines 122 and 124 may comprise any other suitable number of metalization layers 140.

Referring to FIG. 5, the reference clock line 124 is equally spaced from each of the ground lines 122, from an underlying substrate layer 142 and from an overlying layer 144. In a particular embodiment, the space may be two microns ($\mu$m). In this embodiment, the reference clock line 124 may have a width of 2 $\mu$m, a thickness of 0.6 $\mu$m at each metalization layer and be interconnected at a spacing of 2 $\mu$m. The metalization layers may each comprise aluminum, copper or other suitable conductor material. The lines 122 and 124 are isolated by insulator 126 which may be nitride, semiconductor oxide, or any other suitable material operable to electrically isolate the lines 122 and 124.

Figure 6:
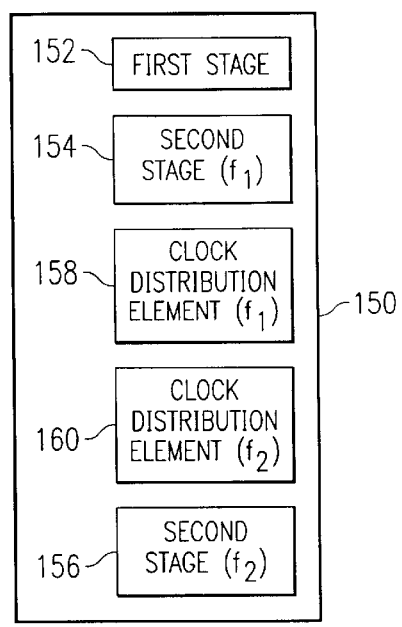

FIG. 6 illustrates details of the clock distribution unit 32 in accordance with another embodiment of the present invention. In this embodiment, the clock distribution unit 32 is a multi-frequency clock distribution unit 150 operable to propagate two reference clock signals. It will be understood that clock distribution unit 150 may include additional and corresponding clock distribution elements and second stage filters in order to propagate any suitable number of reference clock signals.

Referring to FIG. 6, the clock distribution unit 150 includes a first stage RC filter 152 which may be constructed as previously described in connection with first stage RC filter 60 of clock distribution unit 50. The multi-frequency clock distribution unit 150 includes a first second stage RC filter 154 for a first clock frequency and a second second stage RC filter 156 for a second clock frequency. Each of the first and second second stage RC filters 154 and 156 may comprise a single resistor and capacitor pair as described in connection with second stage RC filter 62 of the single frequency clock distribution unit 50. Details of the connection of the second stage RC filters 154 and 156 to the first stage filter 152 are described in more detail in connection with FIG. 7.

A first clock distribution element 158 propagates, repeats and taps a first reference clock line while a second clock distribution element 160 propagates, repeats and taps a second reference clock line. The clock distribution elements 158 and 160 may each be implemented as described in connection with clock distribution elements 110, 112, 114 and 116 of FIG. 4. In this way, multiple clock signals may be propagated in the clock distribution system 14 and powered by RC filtered power to reduce and/or minimize delay induced jitter on the output signals.

Figure 7:
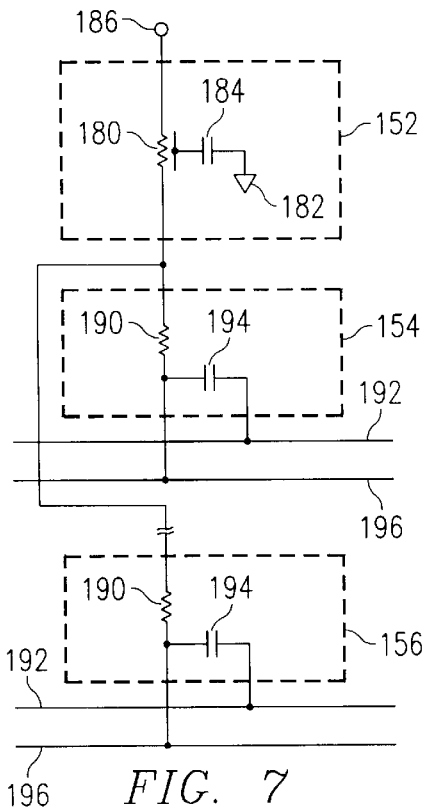

FIG. 7 illustrates details of the first and second stage RC filters 152, 154 and 156 in accordance with one embodiment of the present invention. In this embodiment, the first stage RC filter 152 is a distributed RC filter while each of the second stage RC filters 154 and 156 is a single stage RC filter. As used herein, each means every one of at least a subset of the identified items.

Referring to FIG. 7, the distributed RC filter of the first stage 152 includes a resistor 180 capacitively coupled to ground 182 through a set of capacitors 184. The first stage filter 152 is coupled to and receives power from a chip power supply line (Chip $V_{DD}$) 186 and provides a first stage RC filtered or cleaned power signal to each of the second stage filters 154 and 156.

The second stage filters 154 and 156 each include a resistor 190 capacitively coupled to a clean ground 192 of the clock distribution system 14 by a capacitor 194. The resistors 190 and capacitors 194 of the second stages 154 and 156 are each suitably sized based on the first stage filter 152 and the frequency of the corresponding reference clock. The second stages 154 and 156 each receive the first stage filtered power signal from the first stage 152 and further filters the signals to generate an RC filtered or cleaned power signal. The RC filtered power signal is provided to the corresponding clean power line (Clock $V_{DD}$) 196. The clean grounds 192 may be periodically coupled to each other and to the chip ground 182.

Figure 8:
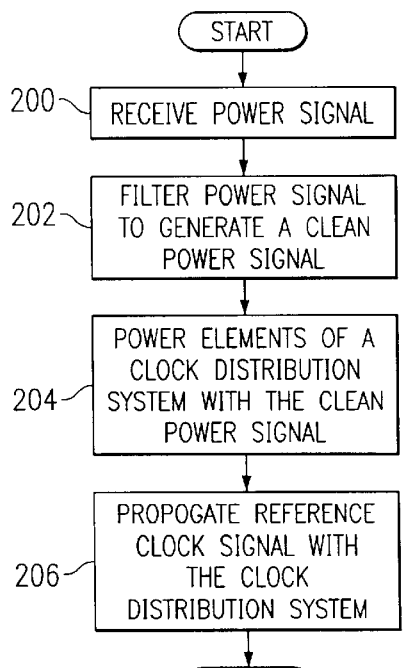

FIG. 8 illustrates a method for distributing a reference clock in an integrated circuit in accordance with one embodiment of the present invention. In this embodiment, a single reference clock signal is propagated within the clock distribution system 14. It will be understood that any suitable number of reference clock signals may be similarly propagated.

Referring to FIG. 8, the method begins at step 200 in which a power signal is received from the on-chip power supply. In one embodiment, the signal is received from an on-chip power supply line fed by an on-chip source. At step 202, the chip power supply signal is filtered with an RC filter to generate a clean power supply signal. The filter attenuates noise in the power supply signal generated by operation of core 16 components of the chip 10. In a particular embodiment, the filtered power supply signal may have a noise level below ±7 mv.

Proceeding to step 204, elements of the clock distribution system 14 are powered with the clean power supply signal. The elements include repeaters and inverters of the output buffers. Next, at step 206, the reference clock signal is propagated within the clock distribution system on the reference clock line by elements of the system. Step 206 leads to the end of the process. The clean power signal may allow the propagation delay and jitter of the reference clock signal to be minimized on high speed chip interface signals and high speed double data rate (DDR) interfaces and serial links.

Figure 9:
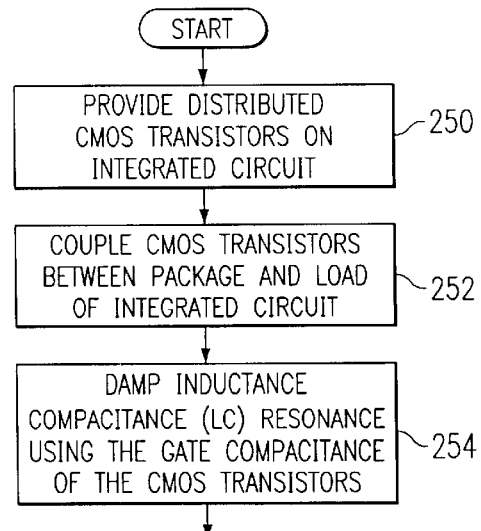

FIG. 9 illustrates a method for providing decoupling capacitance for integrated circuit chip in accordance with one embodiment of the present invention. In this embodiment, the gate capacitance of CMOS transistors are used. It will be understood that other suitable types of MOS and other transistors may be used without departing from the scope of the present invention.

Referring to FIG. 9, the method begins at step 250 in which distributed CMOS transistors are provided on an integrated circuit. In one embodiment, the distributed CMOS transistors may be distributed in a reference clock propagation system, otherwise suitably distributed on an integrated circuit or otherwise disposed within the integrated circuit.

Proceeding to step 252, the CMOS transistors are coupled between the packaging and the load of the integrated circuit. At step 254, the CMOS transistors damp LC resonance using the gate capacitance of the CMOS transistors. Use of the gate capacitance of distributed CMOS or other suitable transistors may provide a single design solution over a broad range of integrated circuit designs.

Although the present invention has been described with several embodiments, several changes and modifications may be suggested to one skilled in the art. It is intended that the present invention encompass such changes and modifications as fall within the full scope of the appended claims.

What is claimed is:

1. A clock distribution system for an integrated circuit, comprising:
    a power supply line operable to provide resistive-capacitive (RC) filtered power;
    a plurality of clock distribution elements coupled to the power supply line and operable to be powered by the RC filtered power to distribute a reference clock signal; and
    a multi-stage RC filter coupling the power supply line to a chip power supply line, the RC filter operable to receive power from the chip power supply line and to generate the RC filtered power.

2. The clock distribution system of claim 1, the clock distribution elements comprising a plurality of repeaters, each repeater coupled to the power supply line and operable to be powered by the RC filtered power.

3. The clock distribution system of claim 2, the repeaters comprising inverters.

4. The clock distribution system of claim 1, wherein the clock distribution system is an on-chip system.

5. The clock distribution system of claim 4, wherein the integrated circuit is in a complimentary metal oxide semiconductor (CMOS) chip.

6. The clock distribution system of claim 1, further comprising a clean ground, the clock distribution elements coupled to the clean ground.

7. The clock distribution system of claim 1, the clock distribution elements comprising a plurality of output buffers.

8. The clock distribution system of claim 7, the clock distribution system further comprising a plurality of high speed serial links each coupled to a corresponding one of the output buffers and operable to transmit data based on the reference clock signal provided by the output buffer.

9. The clock distribution system of claim 7, the output buffers each comprising a plurality of inverters.

10. The clock distribution system of claim 1, the multi-stage RC filter comprising a first-stage, distributed RC filter.

11. The clock distribution system of claim 10, the multi-stage RC filter comprising a second, single stage RC filter.

12. The clock distribution system of claim 1, wherein at least one stage of the multi-stage RC filter comprises a distributed RC filter.

13. The clock distribution system of claim 1, wherein the power supply line comprises a first power supply line providing RC filtered power to clock distribution elements along a first reference clock line, further comprising a second power supply line providing RC filtered power to clock distribution elements along a second reference clock line.

14. The clock distribution system of claim 13, wherein the multi-stage RC filter comprises a shared first stage distributed RC filter, a first second stage RC filter, and a second second stage RC filter, the shared first stage distributed RC filter and the first second stage RC filter coupling the first power supply line to the chip power supply line and the second second stage RC filter and the shared first stage distributed RC filter coupling the second power supply line to the chip power supply line.

15. The clock distribution system of claim 1, the clock distribution system further comprising a plurality of clock distribution units, each clock distribution unit comprising a first stage RC filter, a second stage RC filter and a clock distribution element.

16. The clock distribution system of claim 1, each of the clock distribution elements comprising a reference clock line and a ground line.

17. The clock distribution system of claim 1, each of the clock distribution elements comprising a repeater.

18. The clock distribution system of claim 1, each of the clock distribution elements comprising an output buffer for a serial link.

19. A reference clock module for an on-chip clock distribution system, comprising:
    a plurality of clock distribution units;
    the clock distribution units each comprising a resistive-capacitive RC filter and a clock distribution element; and
    the clock distribution element comprising at least one of a reference clock line, a repeater for the reference clock line, and an output buffer of the reference clock line.

20. The reference clock module of claim 19, wherein the BC filter is a multi-stage filter.

21. The reference clock module of claim 20, the multi-stage RC filter comprising a first-stage distributed RC filter and a second, single stage filter.

22. A method for distributing a clock reference signal in an integrated circuit, comprising:

filtering a power signal from a power supply with a resistive-capacitive (RC) filter to generate a filtered power signal;

powering a plurality of repeaters along a reference clock line with the filtered power signal;

propagating a reference clock signal along the reference clock line with the repeaters; and filtering the power signal from the power supply with a multi-stage RC filter to generate the filtered power signal.

23. The method of claim 22, further comprising outputting the reference clock signal with an output buffer.

24. The method of claim 22, wherein the multi-stage RC filter comprises a first stage distributed RC filter and a second, single stage RC filter.

* * * * *